Oct. 6, 1964    A. A. WITZ    3,151,413
WEEDLESS FISHING LURE
Filed Feb. 26, 1962
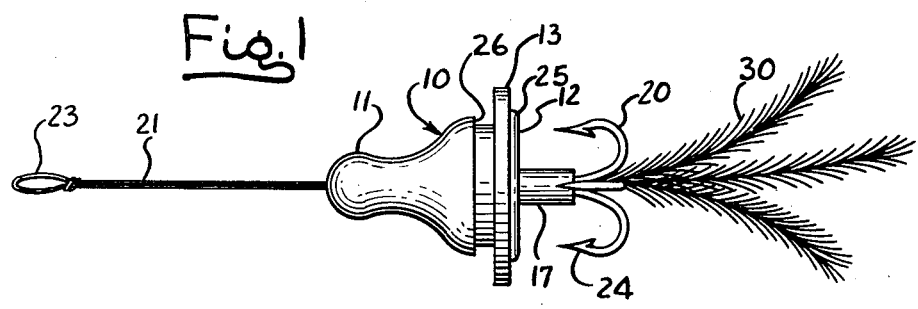
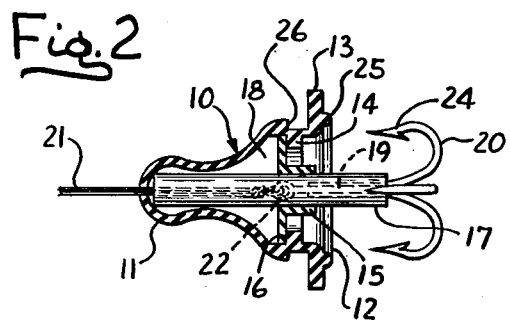
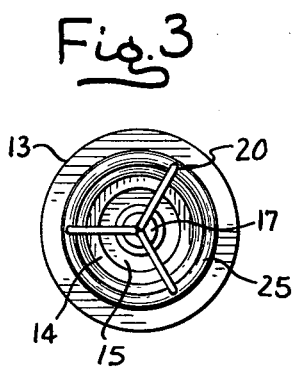
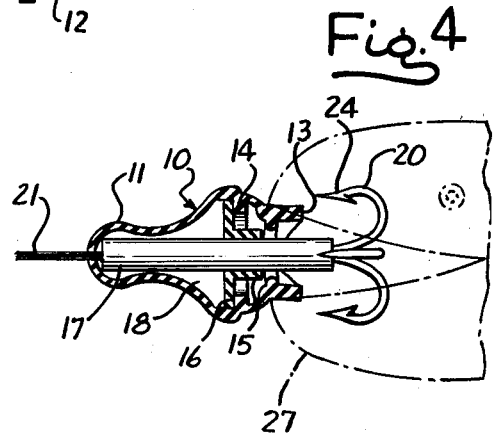
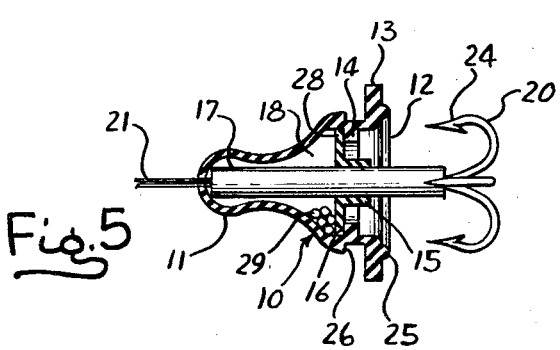
INVENTOR.
ARTHUR A. WITZ
BY
Gary, Desmond & Parker
ATTYS.

3,151,413
WEEDLESS FISHING LURE
Arthur A. Witz, 140 Union St., Crystal Lake, Ill.
Filed Feb. 26, 1962, Ser. No. 175,592
2 Claims. (Cl. 43—42.1)

This invention relates to improvements in a fishing lure, and more particularly to a weedless type lure which may be used either on the surface of water or under the surface thereof.

It is well known that fish are more apt to be caught in waters which are filled with weeds, and as a result many lures have been devised in an attempt to render them weedless so that they may properly function in such waters. For instance, some lures employ metallic wire guards comprising one or more wires which envelope or overlay the fish hook. However, such guards have proven unsatisfactory inasmuch as the wire which is utilized is of such temper that it will readily yield to objects which it may engage thereby exposing the hook to the object and rendering the guard ineffective. The use of more rigid wire would defeat the guard's purpose through its failure to yield and adequately expose the hook when it is struck by a fish.

Also, many lures employ guards constructed of rubber or other resilient non-metallic material in the form of angularly spaced fingers which protrude over the hook. This type of guard has also proved ineffective due to the fact that weeds or other obstructions tend to deflect the guards from their set position thereby either snagging them on the hook or exposing the hook to the weeds.

It is an object of my invention to provide a weedless fishing lure which overcomes the objectionable features previously encountered in this type of lure and which is simple to assemble and inexpensive to manufacture.

Another object is the provision of a fishing lure which may be used on the surface of water, or through a simple operation may be converted for use at a predetermined depth underneath the water.

A further object of the invention resides in the provision of a buoyant fishing lure in the shape of a baby nursing nipple, the resilient outwardly extending annular flange at the bottom of which protects the hook from weeds and other obstructions when the lure is retrieved through water.

Other objects, advantages and features of the present invention will be apparent from the accompanying drawings and following detailed description:

FIG. 1 is a side elevational view of my improved fishing lure.

FIG. 2 is a cross-sectional view through the body of the lure.

FIG. 3 is a plan view thereof.

FIG. 4 is a cross-sectional view with the weed guard flange compressed by the mouth of a fish to expose the barbs of the hook.

FIG. 5 is a cross-sectional view similar to FIG. 2 showing lead pellets in the front body portion of the lure.

Referring in detail to the drawings, the lure comprises an elongated tubular body portion 10 formed in the shape of a baby nursing nipple. The body 10 is constructed of flexible, resilient material, that is a relatively soft, pliant rubber or rubber-like material which is floatable on the surface of water. The body 10 comprises a bulbous front portion 11, which is closed, and an open rear portion 12, the diameter of the front portion being narrow with respect to the relatively larger diameter of the rear open portion. An annular flange 13 extends radially in an outward direction from the rear portion of the body 10 and is integral therewith. Another annular flange 14 extends inwardly of the body 10 adjacent the rear portion thereof.

The inner portion of body 10 is hollow and annular in shape. A separate annular bushing member 15 is frictionally disposed within the body and anchored therein against the flange 14, as indicated at 16. An elongated annular sleeve member 17 is axially disposed within the body 10 and the bushing 15, one end of which extends into the front portion 11 and abuts the nose of the body, the other end of which projects outwardly of the rear portion 12. Inasmuch as the sleeve member 17 is frictionally engaged with the bushing 15 and the latter is likewise frictionally engaged with the inner side wall of the body 10 and flange 14, an air-tight chamber 18 will be formed in the body 10 to lend buoyancy to the lure and permit its use on the surface of the water.

The bushing 15 and sleeve 17 may be constructed of flexible rubber-like material, plastic, or the like, and although they have been illustrated and described as separate members it is contemplated that they may be constructed as an integral member for sealing the chamber 18.

Shank 19 of a treble or gang fish hook 20 is axially disposed in the sleeve 17 at the outwardly projecting portion thereof. A catgut cord or the like 21 extends through the nose of the front portion 11 into sleeve 17 and is engaged with an eye 22 at the end of hook 20, said cord being provided with a loop 23 for securement to a fishing leader. The nose of the front portion 11 through which the cord 21 protrudes and the extremity of sleeve 17 in which the shank of the fish hook is disposed are both adequately sealed to prevent seepage of water into chamber 18 which might interfere with the buoyancy or maneuverability of the lure. The performance or attractiveness of the lure may be enhanced by providing a hackle 30, such as feathers, tinsel, or the like, at the end thereof in association with the hook 20.

An important feature of the present invention resides in the provision of a flange, or shield, in front of the fish hook which is of larger diameter than the barbed portion of the hook. Inasmuch as the surface of the flange is smooth and unbroken it will tend to deflect weeds or other obstructions along the entire circumference thereof and away from the hook. The diameter of flange 13 is approximately one and one-half inches while that of the barbed portion 24 of the hook is approximately one inch. Inasmuch as the shank of hook member 20 is axially disposed within the body 10 through the medium of sleeve 17, the barbs 24 will be held in a stationary position and spaced approximately one-half inch outwardly from the rear face of flange 13. It will be evident that in view of the larger diameter of the flange with respect to the barbed portion of hook 20, the perimeter of the flange will extend beyond that of the hook. Further, the outside diameter of the annular flange 13 is substantially three times larger than the diameter of the bulbous-shaped closed front end 11. The foregoing dimensions are given by way of example and may be varied depending upon the size of the hook employed with the lure.

Although I have found it preferable to anchor one end of sleeve 17 in the nose of body 10 to maintain and space the barbed portion of hook 20 a predetermined distance away from flange 13 when it is compressed, as shown in FIG. 4, and as will be later described, it is also contemplated that the length of sleeve 17 may be varied within the front portion of body 10, that is it may be constructed flush with the inner wall of bushing 15 or it may extend any distance into the chamber 18 short of the nose of body 10.

In further development of the lure, an annular bead 25 is provided on the rear surface of flange 13 adjacent the open rear end of body 10, and an annular shoulder 26 is carried upon the outer surface of said body adjacent flange 13. The provision of these members affords a certain amount of rigidity to flange 13 as well as contraction thereof when it is struck by the mouth of a fish.

The provision of bead 25 on flange 13 imparts sufficient rigidity to the flange to enable the latter to direct the lure in a direction away from weeds when they are encountered, or when yielding to an obstacle the flange sets up an increasing resilient pressure which tends to spring the lure away therefrom.

In view of the flexibility of flange 13 it may be readily compressed by the squeezing force of the mouth of a fish 27 biting same and contracted to a position, such as shown in FIG. 4, to expose the barbs of the hook to the fish. As mentioned above, the barbs 24 of the hook are spaced a sufficient distance away from flange 13 so that the latter will not engage the hook when it is compressed by the mouth of a fish. When a fish is disengaged from the hook the flange, being resilient, will return to its normal position.

The lure, in addition to being weedless, may be readily converted from a surface lure to one which may be operated under the surface of water. Water weeds and other forms of aqua vegetation are known to exist in layers at variable depths below the surface of the water depending on their species. A desirable feature of a subsurface lure is to control the depth at which it is operated and retrieved, as experienced fishermen have found that the most productive fishing area is approximately eighteen inches above the weed beds, which depth also permits observation of the lure's action. Fishing lures currently available are either of the surface type or they are of a specific gravity greater than that of water which results in their sinking to extreme depths.

The lure of the present invention incorporates the desirable qualities of both surface and sub-surface lures in a single device, as will be noted by reference to FIG. 5 of the drawings. The structure of the lure illustrated in this figure is the same as that illustrated and decribed above in connection with FIGS. 1–4. Inasmuch as the laterally extending flange 28 of bushing 15 is resilient it may be pushed into chamber 18 a short distance to permit insertion of lead split shot or pellets 29 into the chamber, after which the flange 28, due to its resiliency, will assume its normal position against inner flange 14 to maintain the chamber air-tight. The lure may be weighted in this manner to function at any predetermined depth depending upon the number of pellets which are inserted into the chamber. The pellets my be removed in the same manner when it is desired to use the lure on the surface of the water.

Many modifications of the present invention may be made by anyone skilled in the art without departing from the spirit of the invention. For instance, the front portion 11, instead of being bulbous, may be shaped in the form of a cone or cylinder, and the flange 13, instead of being annular, may be shaped in the form of a square or an octagon. These and other obvious modifications may be made and are broadly contemplated in the present invention. Hence, it is not intended that the invention be limited to the exact details shown and described except as necessitated by the appended claims.

I claim:

1. A fishing lure comprising in combination, a one-piece elongated tubular body of light floatable flexible resilient material having a bulbous-shaped closed front end, a concave intermediate section extending from said closed front end, and an open rear end section extending from said concave intermediate section which is of relatively larger diameter than the closed front end and concave intermediate section, an integral annular flange extending radially in an outward direction from and around the rear terminal end portion of said tubular body, the outside diameter of said annular flange being substantially three times larger than the diameter of the bulbous-shaped closed front end, a separate elongated sleeve extending axially of the tubular body from adjacent the bulbous-shaped closed front end and projecting outwardly of the open rear end of said tubular body, an integral annular inner flange extending radially and inwardly of the tubular body adjacent the open rear end section thereof, an annular bushing sealingly connected to the inner wall of said tubular body and to the inner wall of said annular inner flange, said bushing frictionally embracing said elongated sleeve and forming a sealed chamber within said tubular body, a fish hook having its shank disposed within said sleeve and its barbed hook end disposed outwardly of and adjacent said open rear end portion of the tubular body, an anchor line engaged to the eye of the hook within said sleeve and extending therethrough and outwardly of said bulbous-shaped closed front end.

2. A fishing lure comprising in combination, a one-piece elongated tubular body of light floatable flexible resilient material having a bulbous-shaped closed front end, a concave intermediate section extending from said closed front end, and an open rear end section extending from said concave intermediate section which is of relatively larger diameter than the closed front end and concave intermediate section, an integral annular flange extending radially in an outward direction from and around the rear terminal end portion of said tubular body, the outside diameter of said annular flange being substantially three times larger than the diameter of the bulbous-shaped closed front end, a separate elongated sleeve extending axially of the tubular body from adjacent the bulbous-shaped closed front end and projecting outwardly of the open rear end of said tubular body, an integral annular inner flange extending radially and inwardly of the tubular body adjacent the open rear end section thereof, an annular bushing sealingly connected to the inner wall of said tubular body and to the inner wall of said annular inner flange, said bushing frictionally embracing said elongated sleeve and forming a sealed chamber within said tubular body, a sinker loosely carried within said sealed chamber, a fish hook having its shank disposed within said sleeve and its barbed hook end disposed outwardly of and adjacent said open rear end portion of the tubular body, an anchor line engaged to the eye of the hook within said sleeve and extending therethrough and outwardly of said bulbous-shaped closed front end.

References Cited in the file of this patent

UNITED STATES PATENTS

| | | |
|---|---|---|
| 779,744 | Shakespeare | Jan. 10, 1905 |
| 981,454 | Miller et al. | Jan. 10, 1911 |
| 1,333,318 | Kijima | Mar. 9, 1920 |
| 1,948,983 | Danielczuk | Feb. 27, 1934 |
| 2,591,558 | Kramer | Apr. 1, 1952 |
| 2,625,767 | Pokras | Jan. 20, 1953 |